Patented May 10, 1932

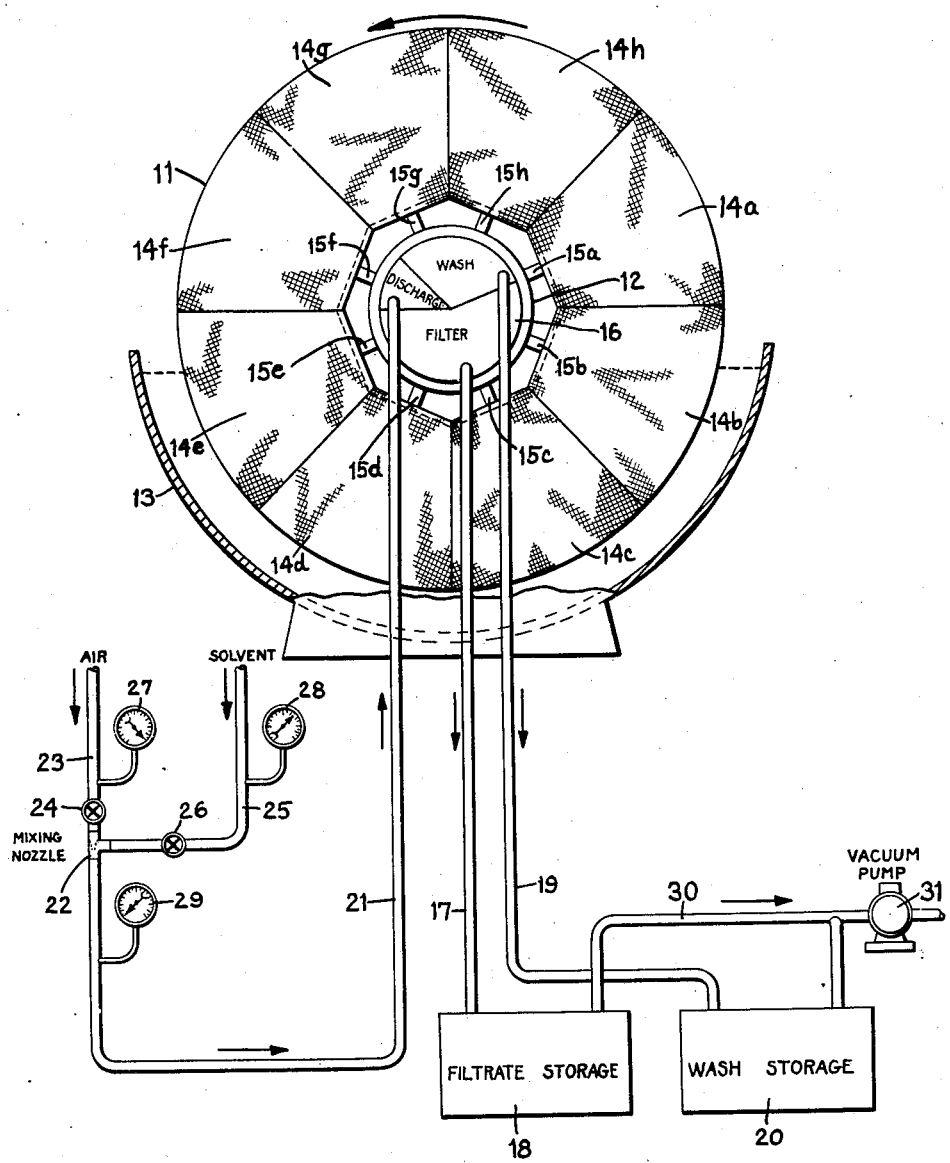

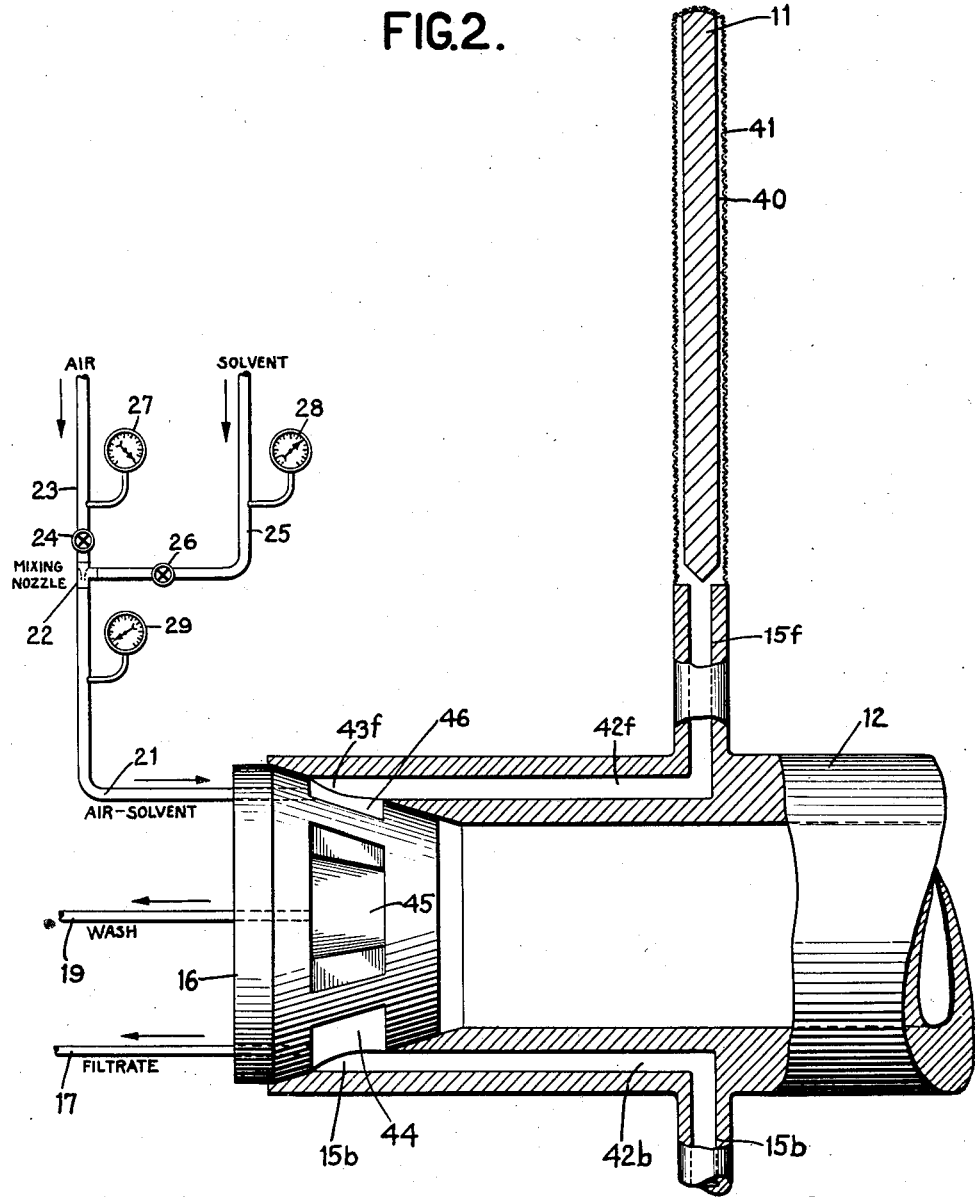

1,857,810

UNITED STATES PATENT OFFICE

WILLIAM P. GEE, OF PORT ARTHUR, TEXAS, ASSIGNOR TO THE TEXAS COMPANY, OF NEW YORK, N. Y., A CORPORATION OF DELAWARE

FILTRATION

Application filed January 24, 1929. Serial No. 334,636.

This invention relates to a process of filtration particularly adapted for the filtration of precipitated waxy constituents from hydrocarbon oil. In its broadest aspect the invention comprises a process of continuous filtration of solids from liquids wherein the filtering surface employed passes alternately through zones of positive pressure filtration and reverse pressure discharge respectively. During passage through a zone wherein filtration takes place, solids are deposited from the material being filtered upon the filtering surface while the liquid portion passes through as filtrate. During passage of the filtering surface through a zone of discharge, a back pressure is applied to the reverse side of the filtering surface, tending to dislodge the filter cake deposited upon the opposite side. While passing through the zone of discharge the reverse side of the filtering surface cloth is treated or sprayed with a suitable washing liquid.

In one embodiment of the invention precipitated waxy constituents are continuously filtered from chilled hydrocarbon oil, using a continuous vacuum filter. Preferably, the process may be carried on in the presence of a comminuted solid filter-aid material. In an application of the invention using a particular type of vacuum filter, the oil is drawn through the filtering surface by a vacuum, leaving the precipitated wax and filter-aid material deposited upon the outer side of the filtering surface in the form of a cake. After the filtering surface has passed through the zone of filtration and a cake of wax and filter-aid material has been built up thereon, a back pressure of air or other suitable gas is applied to the reverse side of the surface in a direction opposite to the flow of the filtrate, tending to loosen the filter cake and allow it to be scraped free and discharged from the surface. Simultaneously an oil solvent, such as petroleum naphtha, is sprayed in the form of a finely separated mist against the reverse side of the filtering surface, into which it is forced by the back-pressure of the air or gas applied to the surface. This procedure removes slimy and sticky substances such as low-melting waxes which may be deposited in the pores of the filter cloth and thereby tend to retard the rate of filtration.

The invention may be clearly understood from the following description thereof in connection with a consideration of the accompanying figures of the drawings, which illustrate diagrammatically, partly in section, apparatus suitable for carrying on the invention. In the figures of the drawings, like numerals designate like parts of the apparatus.

Referring to the drawings, Fig. 1, there is illustrated diagrammatically an elevation of a continuous vacuum filter of the type commonly known as the American Continuous Filter. The filter consists of a disc 11 mounted upon the central shaft 12. Suitable mechanism (not shown) is provided for rotating the shaft 12 and disc 11 in a counter-clockwise direction. The lower portion of the disc 11 is submerged in the liquid or suspension to be filtered, contained in the pan 13. The material to be filtered may be supplied to the pan 13 by any suitable means (not shown).

The disc 11 is built up of a number of sections, 14a, 14b, etc., mounted radially around the hollow central shaft 12. The sections consist of an inner frame of wood or metal covered with a suitable filter cloth. The construction is shown in Fig. 2 and is described more in detail in connection with the discussion thereof. Each individual section is connected by means of a corresponding conduit 15a, 15b, etc. to the hollow central shaft 12, and is an independent and separate filtering element.

A filter valve 16 is provided, centered at the end of the hollow central shaft 12, the construction of which will be described in detail in connection with Fig. 2 of the drawings. Connections are provided to the filter valve 16 communicating with the corresponding ports in the valve (not shown in this figure). The connections are:—the line 17 leading to the storage tank 18; the line 19 leading to the storage tank 20; the line 21 leading to the filter valve from the mixing nozzle 22. An air line 23 provided with a valve 24 leads to one connection of the mixing nozzle, as does a line 25, fitted with the valve 26, leading from a source of supply (not shown) of a suitable washing liquid or solvent. Suitable pressure gauges 27, 28, 29 are provided as shown. A line 30 connecting through suitable branches to the storage tanks 18 and 20, leads to a vacuum pump 31.

Referring to Fig. 2 of the drawings, there is illustrated diagrammatically a sectional elevation of the hollow central shaft 12 and of the disc 11 of the filter illustrated in Fig. 1. An elevation (not in section) is shown of the filter valve 16. The construction of a section of the filter disc 11 is shown, the frame 40 being covered with a suitable filter cloth 41. The individual sections of the disc 11 are connected to the hollow central shaft 12 by conduits 15, as described in connection with Fig. 1. Conduits $42a$, $42b$, etc. are provided in the wall of the hollow central shaft 12, connecting to the corresponding conduits $15a$, $15b$, etc., as shown, and extending to the valve end of the shaft 12, where they form ports $43a$, $43b$, etc. in the tapered section of the shaft 12, forming a seat for the filter valve 16.

In the filter valve 16 suitable ports are provided which, during the counterclockwise rotation of the central shaft 12, register periodically with the ports $43a$, $43b$, etc. at the proper intervals to provide vacuum filtration, vacuum wash, and pressure discharge conditions to the individual sections $14a$, $14b$, etc. of the filter disc 11, in accordance with the position of the individual sections in the cycle. Thus the port 44 may be connected to the vacuum filtrate line 17 and thereby provide a condition of vacuum filtration for each individual section $14a$, $14b$, etc. throughout approximately 210° of the 360° cycle of operation. The port 45 may be connected to the wash line 19 and thus provide conditions for maintaining the sections under vacuum while undergoing washing through a range of approximately 120° of the cycle of operation. The port 46 is so designed as to provide air or gas pressure and a spray of washing liquid through the line 21 to the reverse side of the filtering surface of the sections $14a$, $14b$, etc., while passing through the discharge zone, which may cover approximately 30° of the 360° cycle of operation. Suitable approximate positions of such zones of filtration, washing and discharge are indicated on the face of the valve 16, as shown in Fig. 1 of the drawings.

Suitable means (not shown) are provided for scraping the filter cake from the filtering surface during the discharge portion of the cycle of operation.

The procedure of the process in connection with the apparatus shown may be as follows:—

The filter is put in operation by starting the mechanism required to rotate the disc 11 in a counterclockwise direction. The material to be filtered is introduced into the pan 13, a liquid level being maintained sufficient to cover the filtering element or the sections thereof as they pass through the liquid. In the operation under consideration, the filtering of wax from hydrocarbon oil, a suitable wax-bearing oil may be used, such for example as a cylinder stock, and the oil is chilled to precipitate waxy constituents. In order to reduce the viscosity and to aid in the precipitation of the constituents, the oil is preferably diluted by means of a suitable solvent, which may be petroleum naphtha or the like. The temperature to which the oil is chilled to effect precipitation of the waxy constituents will depend somewhat upon the degree of dewaxing desired. By way of example, it may be said that the oil before dewaxing may have a wax content of such nature that it will have a congealing point or pour test of approximately 100° F., and it being desirable to reduce the pour test or congealing point to approximately 40° F., the oil, before being introduced into the pan 13, may be chilled to a temperature of approximately 25° F.

After chilling and prior to its introduction into the filter, the oil is preferably mixed with a comminuted solid filter-aid material, such for example as diatomaceous earth or other suitable material, in a proportion of approximately 5 to 30 lbs. of filter-aid material per barrel of oil.

As each individual section $14a$, $14b$, etc. of the filter disc 11 becomes submerged in the liquid contained in the pan 13, the port 44 of the valve 16 registers with the corresponding port $43a$, $43b$, etc. in the valve seat composed of the tapered section of the central shaft 12, thereby connecting the particular section of the disc 11 to the filtrate storage tank 18, which is maintained under vacuum by means of the vacuum pump 31. Thus a vacuum is applied to the filtering section whereby the oil is drawn through the filtering surface, producing a deposit or filter cake consisting of the precipitated wax and filter-aid material upon the outer surface of the filtering surface of the section. The filter-aid material is of value in building up a more porous filter cake, thereby increasing the rate of filtration for a surface of given area.

As the disc 11 rotates, each individual section $14a$, $14b$, etc. passes upward out of the liquid maintained in the pan 13 and enters the washing section of the cycle of operation. Thus when any individual section 14 of the disc 11 enters this portion of the cycle, the port 45 of the valve 16 registers with the corresponding port 43, connected through the conduit 42 to the particular section 14, whereby a vacuum is maintained on the section by means of the vacuum pump 31 through the wash storage tank 20 and the wash line 19. Washing liquid, which may consist of an oil solvent such as petroleum naphtha, is applied to the outer surface of the filter cake in the form of a spray by means of suitable apparatus (not shown), and being drawn through the filter cake by means of the vacuum maintained on the section, tends to wash out any oil contained in the cake, thereby producing a more complete separation of oil and wax. The washing material collected in the storage tank 20 thus consists of a comparatively dilute solution of oil in the solvent used, and the solvent may be separated and recovered by distillation, or the material may be used for the dilution of additional wax-bearing oil stock to be dewaxed.

If desired, the step of washing may be dispensed with, in which case the application of vacuum to the filter sections after emerging from the liquid maintained in the pan 13, tends to draw further oil from the cake and to produce a further separation of the wax and oil.

Passing the washing section of the cycle of operation, the individual sections 14a, 14b, etc. of the disc 11 enter the discharge portion of the cycle. Here the port 46 of the valve 16 registers with the port 43 of the corresponding filter section 14.

At this point in the cycle of operation a suitable gas, preferably air, from the line 23 through the line 21 is injected through the ports 46 and 43 and the conduits 42 and 15 into the filter section 14. This air pressure applied to the reverse side of the filter cloth 41 tends to force off the filter cake built up on the outside of the filter 41, and, as the rotation of the disc proceeds, the filtering surface passes a fixed scraping mechanism (not shown) which scrapes off and discharges the loosened filter cake.

In the dewaxing of hydrocarbon oils by the method described, it has been found that the operation is not satisfactory when conducted over any appreciable length of time, as certain waxy constituents of the oil become deposited in the pores of the filter cloth, forming a sticky, slimy coating, which reduces the filtering rate to such an extent that the filtering surface may require cleaning at frequent intervals in order that the operation may be carried on at all. To avoid this difficulty, the process is conducted in accordance with the present invention whereby, during the discharge portion of the cycle of operation, the filter cloth or surface is subjected not only to a reverse pressure tending to loosen the cake from the cloth, but also to the washing action of a suitable washing material.

The washing material used in the process under consideration may consist of a suitable oil solvent, such for example as petroleum naphtha, which may be applied to the inner surface of the filter cloth in the form of a mist or spray. Thus the air, entering the filter through the port 46 of the valve 16, supplied from the air line 23, may pass through the mixing nozzle 22, where it is mixed with petroleum naphtha in suitable proportions to form a spray or mist, which then passes through the line 21 to the valve port 16, etc., to the inner portion of the filter section. A pressure of approximately 2 lbs. per sq. in. may be maintained on the line 21. The air passing through the filter cloth 41 deposits the mist of solvent upon the inner surface of the cloth which is forced through the cloth where it effectively dissolves and discharges the slimy and sticky deposit in the pores of the cloth, thereby rendering it more pervious to the filtrate and greatly increasing its filtering capacity.

As the filter disc 11 continues to revolve, the section under consideration passes from the discharge portion of the cycle again into the filtering portion of the cycle, and the cloth, being in a thoroughly pervious condition, filtration again proceeds in the manner described.

Many modifications and variations of the invention may be made without departing from the spirit and scope thereof, and therefore only such limitations should be imposed as are indicated in the appended claims.

What I claim is:

1. A process of dewaxing hydrocarbon oils which comprises continuously charging a mixture of oil, precipitated wax and comminuted filter aid material to a filtering zone wherein a plurality of filtering surfaces pass alternately through zones of positive pressure filtration and reverse pressure discharge, depositing solids in the form of a compact cake on the one side of the filtering surfaces while in the zone of positive pressure filtration, applying a back pressure of an incondensible gas uniformly over the entire reverse side of the filtering surfaces while in the zone of reverse pressure discharge and simultaneously mixing an oil solvent in the form of a mist with said gas to dissolve waxy constituents from the pores of the filtering surfaces and loosen the cake therefrom, removing the dislodged filter cake to produce substantially clean filtering surfaces prior to the entrance of said surfaces to the zone of positive pressure filtration, and collecting a dewaxed oil from the system.

2. A process of dewaxing hydrocarbon oils which comprises continuously charging a mixture of oil, precipitated wax and comminuted filter aid material to a filtering zone wherein a plurality of revolving filtering surfaces pass alternately through zones of positive pressure filtration and reverse pressure discharge, depositing solids in the form of a compact cake on the one side of the filtering surfaces while in the zone of positive pressure filtration, applying a back pressure of compressed air uniformly over the entire reverse side of the filtering surfaces while in the zone of reverse pressure discharge and simultaneously spraying petroleum naptha in the form of a finely separated mist against the reverse side of the filtering surfaces into which it is forced by said compressed air to remove waxy constituents from the pores and loosen the cake therefrom, removing the dislodged filter cake to produce substantially clean filter surfaces prior to the entrance of said surfaces to the zone of positive pressure filtration, and collecting a dewaxed oil from the system.

3. A process of separating waxy constituents from hydrocarbon oils which comprises maintaining a body of chilled hydrocarbon oil and precipitated wax in a filtering zone, revolving through said body a series of partially immerged disc members, each containing a plurality of bag-like filtering surfaces, passing said filtering surfaces during each revolution successively through zones of filtration, wash and discharge, applying a vacuum to the interior of said filtering surfaces when entering the zone of filtration whereby the waxy constituents are deposited upon the exterior of said surfaces in the form of a compact filter cake and a dewaxed oil is passed to the interior thereof, spraying an oil solvent on said filtering surfaces while in the zone of wash to dissolve oil from said cake, releasing the vacuum as the filtering surfaces enter the zone of discharge and applying a back pressure of an incondensible gas uniformly over the whole interior thereof to loosen the filter cake, simultaneously spraying an oil in the form of a mist into said gas to force said mist against the interior of the filtering surfaces and to dissolve waxy constituents from the pores thereof, removing the dislodged filter cake to produce substantially clean filtering surfaces prior to the entrance of said surfaces to the zone of filtration, and collecting a dewaxed oil from the system.

4. In a rotary suction filter for separating wax and like constituents from hydrocarbon oils, a plurality of filter elements radially mounted around a central shaft, said shaft being provided with conduits communicating with said filter elements, a valve containing suitable ports centered at one end of said shaft, a filtrate line, a wash liquid line and a reverse pressure gas line connected to individual ports in said valve, means for applying a vacuum to the filtrate and wash liquid lines, means for mixing a solvent in the form of a mist with the gas in said gas pressure line, the entire arrangement being such that when the shaft is rotated, the conduits therein register with the ports in said valve so that the filter elements communicate successively with the vacuum filtrate line to produce filtration and deposition of solids on the filter elements, then with the vacuum wash line to draw a washing liquid through the filter cake, and finally with the gas-solvent pressure line to discharge the filter cake and dissolve waxy substances from the pores of the filter elements.

5. In combination with a continuous rotary suction filter having a reverse pressure discharge line for discharging the filter cake from the filter elements, a mixing nozzle in said line, means for separately introducing under pressure an oil solvent and a compressed gas into the mixing nozzle to produce a mist of the solvent in the gas whereby the waxy materials are dissolved from the pores of said filter elements after said filter cake has been discharged.

In witness whereof I have hereunto set my hand and seal this 19th day of January, 1929.

W. P. GEE.